United States Patent [19] [11] 3,902,979
Thomas [45] Sept. 2, 1975

[54] INSULATOR SUBSTRATE WITH A THIN MONO-CRYSTALLINE SEMICONDUCTIVE LAYER AND METHOD OF FABRICATION

[75] Inventor: Richard N. Thomas, Murrysville, Pa.

[73] Assignee: Westinghouse Electric Corporation, Pittsburgh, Pa.

[22] Filed: June 24, 1974

[21] Appl. No.: 482,193

[52] U.S. Cl. .......... 204/129.3; 204/129.65
[51] Int. Cl.$^2$ .......... C25F 3/00
[58] Field of Search .......... 204/129.3, 129.65

[56] References Cited

UNITED STATES PATENTS

| | | | |
|---|---|---|---|
| 3,096,262 | 7/1963 | Shockley | 204/129.3 |
| 3,397,278 | 8/1968 | Pomerantz | 156/272 |
| 3,536,600 | 10/1970 | Van Dijk et al. | 204/129.3 |
| 3,616,345 | 10/1971 | Van Dijk | 204/129.3 |
| 3,640,807 | 2/1972 | Van Dijk | 204/129.3 |
| 3,655,540 | 4/1972 | Irvin | 204/129.3 |

OTHER PUBLICATIONS

Journal of Electro Chemical Society, Vol. 118, July 1971, pgs. 1240–1246.

*Primary Examiner*—T. M. Tufariello
*Attorney, Agent, or Firm*—W. G. Sutcliff

[57] ABSTRACT

A structure consisting of a thin, mono-crystalline semiconductive layer on an insulating substrate, and a method of fabrication is detailed. The resultant thin semiconductor-on-insulator substrate is useful as a starting substrate in fabricating microelectronic devices.

9 Claims, 5 Drawing Figures

INSULATOR SUBSTRATE WITH A THIN MONO-CRYSTALLINE SEMICONDUCTIVE LAYER AND METHOD OF FABRICATION

BACKGROUND OF THE INVENTION

For many microelectronic device applications, thin, high crystalline quality layers of mono-crystalline semiconductor on dielectric substrates are required. The standard technique for providing device quality thin layers of semiconductor material is a high temperature epitaxial growth technique. The processing temperature required for growing the semiconductive layer on the substrate is such that a high temperature substrate material is required, such as a sapphire substrate. Such a prior art technique is taught in U.S. Pat. No. 3,796,597. Crystalline defects which can occur in thin semiconductor films of less than 10 micrometers become accentuated in films in the order of about 2 micrometers or less.

Prior art silicon-on-sapphire devices wherein the silicon is epitaxially deposited on the sapphire insulator provide electrically poor silicon thin layers, particularly when the silicon layer is of the order of two micrometers or less. The charge mobility in such prior art epitaxially grown silicon layers on sapphire is typically only 30 to 50 percent of that for bulk silicon, even when the layer is grown to a thick layer.

The range of applications for such semiconductor-on-insulator combinations could be greatly extended if the thin semiconductor layer can be made having a high charge mobility, with near-bulk material crystallographic and electrical properties.

It is also desirable to be able to use a low melting point insulator material in forming such semiconductor-on-insulator structures.

The encapsulation or bonding of a silicon semiconductor with a glass insulator is taught in U.S. Pat. No. 3,397,278. This process involves heating the insulator element to increase its electrical conductivity and applying a potential across the mated elements to bond them together in intimate relationship.

The thinning of crystalline silicon is taught in "Preparation of Thin Silicon Crystals by Electrochemical Thinning of Epitaxially Grown Structures" published in *Journal of Electrochemical Society, Vol.* 117, 1970; and "Electrochemically Thinned N/N+ Epitaxial Silicon Method and Applications" published in *Journal of Electrochemical Society, Vol.* 118, 1971. These articles teach an electrochemical technique in which an *n*+ silicon substrate which has a thin n- epitaxial silicon layer thereon is processed by anodic dissolution to remove the *n*+ silicon substrate leaving the remaining *n*− epitaxial silicon layer. These articles express the desirability of providing a thin, high quality silicon crystalline material on a large area insulating substrate, but do not suggest how the thin, high quality, n- type silicon crystal can be effectively provided on the insulating substrate.

SUMMARY OF THE INVENTION

A starting substrate for use in fabricating microelectronic devices is described consisting of an insulating substrate with a thin layer of epitaxially grown semiconductive material thereon. The semiconductive material is disposed on one side of the insulating substrate as a thin epitaxially grown monocrystalline semiconductive layer having a high charge mobility. A thin mono-crystalline layer of n− type semiconductive material is epitaxially deposited onto one side of a highly doped *n*+ same semiconductive material. The wafer is electrostatically bonded to an insulating substrate with the *n*− type semiconductive layer mated with the insulating substrate. The bonded suubstrate is electrochemically etched to remove the highly doped *n*+ semiconductive material and to expose the thin epitaxially grown *n*− semiconductive layer upon the insulating substrate.

DESCRIPTION OF THE PREFERRED EMBODIMENT

Figure 1:
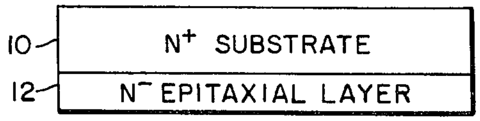
FIG. 1 is an enlarged elevational view in section of the semiconductive substrate wafer with the epitaxially grown n− semiconductive layer thereon.
Figure 2:
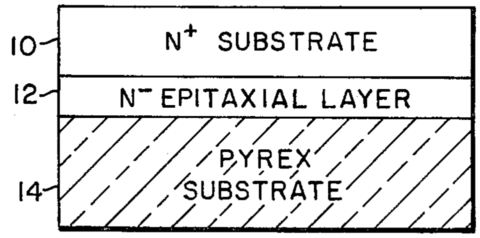
FIG. 2 is an enlarged elevational view in section of the structure of FIG. 1 electrostatically bonded to an insulating substrate.
Figure 3:
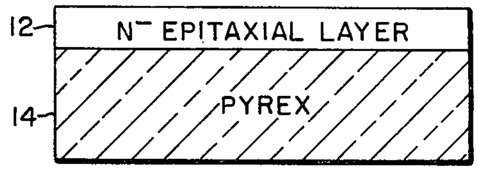
FIG. 3 is an enlarged elevational view in section of the resultant insulating substrate with a thin monocrystalline layer of n− semiconductor thereon, which structure is readily usable as the starting substrate in fabricating microelectronic devices.
Figure 4:
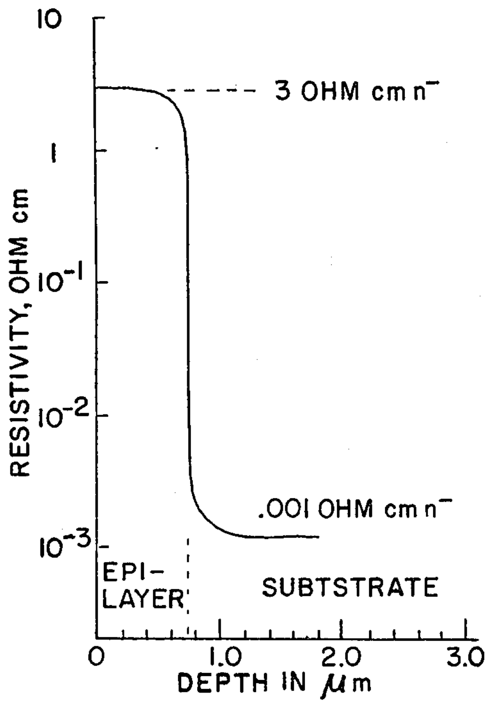
FIG. 4 is a graph of the resistivity profile for an exemplary silicon embodiment in which the resistivity of the epitaxial silicon in ohm centimeters is plotted against the depth in micrometers.

The fabrication process is readily appreciated by reference to FIGS. 1 through 3 and will be explained by reference to a silicon-on-glass embodiment. An n+ silicon wafer substrate 10 which is highly phosphorous doped is the starting material, and the surfaces are chemically and mechanically polished. The silicon wafer 10 is preferably of the crystalline structure (111), and has by way of example a 1¼ inch diameter and is about 0.009 inches thick. An n− epitaxially grown silicon layer 12 is deposited on the n+ substrate 10. The epitaxial growth is carried out using standard hydrogen reduction of silicon tetrachloride in a radio frequency heating reactor. The n+ substrate is briefly pre-etched in hydrochloric acid ab about 1150° Centigrade. The epitaxial growth of the n− layer and simultaneous doping thereof utilizing 5 part per million $PH_3$ is carried out at about 1150°C. The n− layer is grown to a thickness of about 0.8 micrometers on one surface of the n+ substrate 10. The epitaxially grown layer was tested using the spreading resistance probe method to determine resistivity profile. The results of such a test are plotted in FIG. 4 and indicate that a 3 ohm centimeter n− type epitaxial layer of uniform thickness of about 0.8 micrometers is deposited on the approximately 0.001 ohm centimeter substrate.

The next step in the fabrication process is to electrostatically bond the n− layer deposited n+ substrate upon a pyrex substrate 14. The pyrex substrate of a borosilicate pyrex glass has flat polished surfaces, and is matched in size to the silicon wafer size, so that it is about 1¼ inch in diameter and about ⅛ inch thick. The silicon wafer is placed in contact with the pyrex substrate so that the n− epitaxial layer mates with the pyrex substrate. The combination is heated to a temperature of from about 300°–350°C while applying a voltage between the silicon wafer and the bottom surface of the pyrex using a platinum probe. The more positive potential terminal is connected to the n+ substrate, and the voltage is increased stepwise while the current is observed and maintained below 5 microamperes, until a voltage of 1000 volts maximum is reached. An intimate and uniform bond is formed between the n− silicon layer coated n+ substrate and the pyrex. Other insulating substrates can be substituted for the pyrex borosilicate glass, such as a "Kovar" glass which is a trademark material of the Westinghouse Electric Corporation.

Figure 5:
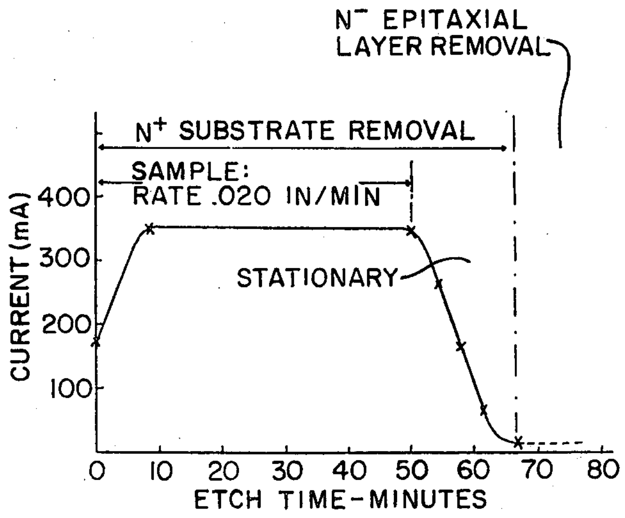
FIG. 5 is a graph of the relationship of electrochemical etching current v. time during the anodic removal of the n+ silicon substrate, with the current in milliamperes plotted against the etch time in minutes.

Now that the epitaxially grown n− mono-crystalline silicon layer 12 is intimately and firmly bonded to the pyrex substrate 14, the n+ silicon substrate is removed by an electrochemical etching process. The thickness of the n+ silicon substrate can be reduced preliminarily to about 0.004 inches by a simple chemical etch using a mixture of nitric, acetic, and hydrofluoric acid. In order to uniformly remove the remainder of the n+ substrate without damaging or removing the n− epitaxial layer following the electrochemical etching process is carried out. The composite structure of FIG. 2 serves as the anode of the electrochemical system with a platinum sheet cathode. The generally planar platinum sheet cathode is closely spaced from the composite of the silicon and pyrex substrate. A protective coating of Apiezon wax is applied over the pyrex surface for protection. An electrochemical bath which is about a 5% aqueous hydrofluoric acid solution is prepared. The electrochemical etching is carried out in the dark with the anode and cathode being lowered slowly and gradually into the aqueous hydrochloric acid solution at a constant rate of about 20 mils per minute, while closely monitoring the current flow. An initial potential of about 6 volts is applied across the anode and cathode of the cell. The graph in FIG. 5 illustrates the current level obtained during the n+ substrate removal, and the dramatic decrease of the current level indicates that the entire n+ substrate has been removed and the etching is stopped.

The crystalline quality of the n− silicon layer was checked by reflection electron diffraction, and the diffraction patterns obtained were characteristic of high perfection single crystal silicon. The resultant structure, as seen in FIG. 3 is thus a very attractive starting material for fabrication of microelectronic devices. The silicon-on-glass structure is compatible with low temperature silicon device processing techniques, which are carried out at temperatures below the melting point of the glass substrate. The doping of selected areas can be accomplished by ion implantation or electron beam implantation and with subsequent annealing at temperatures of up to about 500°C the dopant impurities can be activated and implantation damage minimized. The depositing of silicon dioxide films of relatively high thickness can be deposited on the silicon-on-pyrex by the oxidation of silane at about 450°C. The present fabrication technique thus permits low cost fabrication of large area glass substrate with high crystalline quality silicon layers.

Measurements of the electron mobility in thin silicon-on-glass structures have been made using the conventional "van der Pauw" technique. The sample tested was a single crystal n− type silicon layer of 1.5 micrometer thickness and 0.7 ohm centimeter resistivity on a "Pyrex" substrate. The film thickness and resistivity were determined from spreading resistance probe measurements. The electron mobility measured was 700 $cm^2$/volt sec. This is about 70% of the electron mobility in bulk silicon of this resistivity.

The exemplary embodiment discussed above utilized silicon-on-glass. The insulating substrate may also be high temperature materials, such as sapphire, spinel and quartz. When such high temperature substrates are utilized, the resultant structure may be processed into devices using high temperature conventional semiconductor processing techniques. The silicon semiconductive material may be substituted for with other semiconductors such as germanium, group III–V intermetallic semiconductive compounds such as gallium arsenide, and group II–VI compounds such as zinc selenide. The specific doping type for the semiconductive material can also be varied.

I claim:

1. Method of providing a thin epitaxially grown mono-crystalline semiconductive layer having a high charge mobility on an insulating substrate comprising:

a. epitaxially depositing a thin mono-crystalline layer of semiconductive material having a high charge mobility on one side of a semiconductive wafer;

b. electrostatically bonding the semiconductive wafer to an insulating substrate, with the mono-crystalline layer of epitaxially grown semiconductive material mated with the insulating substrate; and c. electrochemically etching the semiconductive wafer away to expose the thin mono-crystalline layer of epitaxially grown semiconductive material upon the insulating substrate.

2. The method specified in claim 1, wherein the electrostatic bonding is carried out while heating the semiconductive wafer-insulating substrate sandwich to a temperature of from about 300°–350°C while applying a relatively high potential between the members.

3. The method specified in claim 1, wherein the heated sandwich has the more positive potential terminal applied to the semiconductive wafer side of the sandwich, with the other potential terminal connected to the exposed insulating substrate surface, with the potential being gradually increased to a value of about 1000 volts while the current is maintained below about 5 microamps.

4. The method specified in claim 1, wherein the insulating substrate is selected from borosilicate glass, spinel, sapphire and quartz.

5. The method specified in claim 1, wherein the electrochemical etching is carried out in an acidic solution with the electrostatically bonded wafer composite serving as the anode which is closed spaced from a noble metal planar cathode, with the etching proceeding until the highly doped semiconductive wafer is removed as indicated by a significant reduction in the etching current.

6. The method specified in claim 1, wherein the insulating substrate is a glass having a softening point temperature less than the epitaxial growth temperature.

7. The method specified in claim 1, wherein the semiconductive material is preferably selected from silicon, germanium and gallium arsenide.

8. The method of providing a thin epitaxially grown mono-crystalline layer of N− silicon having a high charge mobility on an insulating substrate, which method comprises;

a. epitaxially depositing a thin mono-crystalline layer of N− doped silicon having a high charge mobility on one side of a wafer of N+ silicon;

b. electrostatically bonding the N− and N+ wafer composite to an insulating substrate, with the N− side of the wafer mated with the insulating surface;

c. electrochemically etching the N+ silicon away to expose the thin N− silicon epitaxially grown layer.

9. An insulating substrate with a thin epitaxially grown mono-crystalline semiconductive layer on one side thereof, which layer is less than about 2 micrometers thick, the combination of which is useful as a starting substrate in fabricating microelectronic devices, which combination is prepared by the process comprising:

a. epitaxially depositing a thin mono-crystalline layer of lightly doped semiconductive material having a high charge mobility on one side of a highly doped silicon wafer;

b. electrostatically bonding the silicon wafer to an insulating substrate with the epitaxial silicon mated with the insulating substrate;

c. electrochemically etching the highly doped silicon wafer away to expose the thin epitaxially grown mono-crystalline silicon layer upon the insulating substrate.

* * * * *